(12) United States Patent
Zhang et al.

(10) Patent No.: US 12,720,183 B2
(45) Date of Patent: Aug. 25, 2026

(54) ELECTRONIC DEVICE AND WEARABLE DISPLAY DEVICE

(71) Applicants: Lemon Inc., Grand Cayman (KY); Beijing Zitiao Network Technology Co., Ltd., Beijing (CN)

(72) Inventors: Bowei Zhang, Los Angeles, CA (US); Runyu Liu, Los Angeles, CA (US); Xiaokai Li, Beijing (CN)

(73) Assignees: Lemon Inc., Grand Cayman (KY); Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/762,125

(22) Filed: Jul. 2, 2024

(65) Prior Publication Data

US 2025/0016436 A1 Jan. 9, 2025

(30) Foreign Application Priority Data

Jul. 4, 2023 (CN) ......................... 202310814922.5

(51) Int. Cl.

| | |
|---|---|
| ***H04N 23/611*** | (2023.01) |
| ***G02B 27/00*** | (2006.01) |
| ***H04N 23/65*** | (2023.01) |
| ***H04N 23/667*** | (2023.01) |
| ***H04N 23/90*** | (2023.01) |

(52) U.S. Cl.

CPC ....... *H04N 23/611* (2023.01); *G02B 27/0093* (2013.01); *H04N 23/651* (2023.01); *H04N 23/667* (2023.01); *H04N 23/90* (2023.01)

(58) Field of Classification Search

CPC .... G02B 2027/0138; G02B 2027/0132; G02B 2027/014; G02B 27/0093; G02B 27/017; G02B 2027/0178; H04N 23/611; H04N 23/651; H04N 23/61; H04N 23/65; H04N 23/667; H04N 23/90

See application file for complete search history.

(56) References Cited

U.S. PATENT DOCUMENTS

| | | | | |
|---|---|---|---|---|
| 11,474,358 | B2 | 10/2022 | Meitav et al. | |
| 2018/0103202 | A1 | 4/2018 | Eskilsson et al. | |
| 2025/0057023 | A1 * | 2/2025 | Cho ..................... | G02B 27/283 |

FOREIGN PATENT DOCUMENTS

| | | |
|---|---|---|
| WO | 2023/049065 A1 | 3/2023 |

OTHER PUBLICATIONS

European Search Report for EP Patent Application No. 24186080.8, Issued on Nov. 6, 2024, 7 pages.

* cited by examiner

*Primary Examiner* — Boubacar Abdou Tchoussou

(57) ABSTRACT

The disclosure provides a method for an electronic device including a lens; a plurality of light sources disposed on or adjacent to an edge of the lens, and configured to illuminate an eye of a user; at least one camera disposed adjacent to the edge of the lens, and configured to capture an image of the eye; and a controller configured to perform eye tracking for the user based on the image captured by the at least one camera. According to the embodiments of the disclosure, on a premise that the characteristics of the lens are not affected by the electronic device, a feasibility of capturing the eye image and quality of the image are ensured.

8 Claims, 3 Drawing Sheets

100
110
110
120
L
130
130
130
130
H

ELECTRONIC DEVICE AND WEARABLE DISPLAY DEVICE

CROSS-REFERENCE

The present application claims priority to Chinese Patent Application No. 202310814922.5, filed on Jul. 4, 2023, and entitled "ELECTRONIC DEVICE AND WEARABLE DISPLAY DEVICE", the entirety of which is incorporated herein by reference.

FIELD

Example embodiments of the present disclosure generally relate to the field of optical imaging, and in particular to an electronic device and a wearable display device including the electronic device.

BACKGROUND

In recent years, a research has begun to use an eye tracking in a field of Extended Reality (XR) including Virtual Reality (VR), Augmented Reality (AR), Mixed Reality (MR), and so on. For example, for an AR, VR, or MR display device, the eye tracking can be used for imaging display, interactive control, target recognition, identity verification, health monitoring, social interaction, and multi-person collaboration, and many other aspects and provide a user with a clearer and smoother viewing experience.

SUMMARY

In a first aspect of the present disclosure, there is provided an electronic device comprising a lens; a plurality of light sources disposed on or adjacent to an edge of the lens, and configured to illuminate an eye of a user; at least one camera disposed adjacent to the edge of the lens, and configured to capture an image of the eye; and a controller configured to perform eye tracking for the user based on the image captured by the at least one camera.

In some embodiments, the lens comprises a folding optical path lens.

In some embodiments, at least a portion of the plurality of light sources are embedded in the lens.

In some embodiments, the at least one camera comprises a first camera disposed adjacent to an end of the lens along a horizontal axis of the lens.

In some embodiments, the at least one camera comprises a second camera disposed adjacent to an end of the lens along a longitudinal axis of the lens.

In some embodiments, the controller is further configured to based on a position of a predetermined reference portion of the eye of the user in the image, control a working mode of the at least one camera, the working mode being at least associated with a power consumption of the at least one camera.

In some embodiments, at least a portion of the lens, the plurality of light sources, the at least one camera, and the controller are integrated with each other.

In some embodiments, the plurality of light sources comprise light emitting diodes and/or vertical-cavity surface-emitting lasers.

In a second aspect of the present disclosure, there is provided a wearable display device comprising the electronic device as described in the first aspect.

BRIEF DESCRIPTION OF THE DRAWINGS

The above and other features, advantages and aspects of various embodiments of the present disclosure will become more apparent in combination with the accompanying drawings and with reference to the following detailed description. In the accompanying drawings, the same or similar reference marks represent the same or similar elements, wherein.

DETAILED DESCRIPTION

Figure 1:
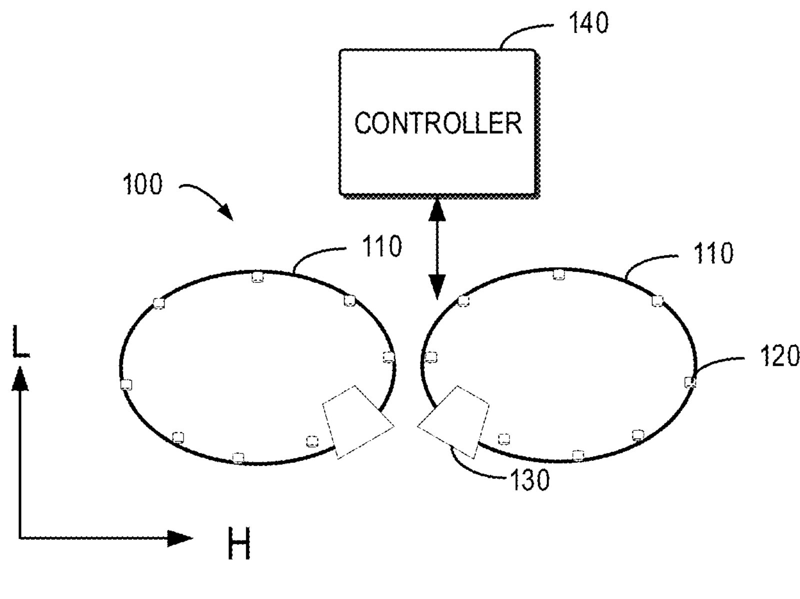
FIG. 1 shows a schematic diagram of an embodiment of an electronic device according to the embodiments of the present disclosure.

The embodiments of the present disclosure will be described in more detail below with reference to the accompanying drawings. Although some embodiments of the present disclosure are shown in the accompanying drawings, it should be understood that the present disclosure can be realized in various forms, and should not be interpreted as limited to the embodiments described here. Instead, these embodiments are provided for a more thorough and complete understanding of the present disclosure. It should be understood that the drawings and embodiments of the present disclosure are only for illustrative purposes and are not intended to limit the scope of protection of the present disclosure.

In the description of the embodiments of the present disclosure, the term "including" and similar terms should be understood as open including, that is, "including but not limited to". The term "based on" should be understood as "at least partially based on". The terms "an embodiment" or "the embodiments" should be understood as "at least an embodiment". The terms "first", "second", and so on can refer to different or identical objects. The following text may also include other explicit and implicit definitions.

In addition, it should be understood that spatial descriptions used in this article (such as "up", "down", "left", "right", "horizontal", "vertical", etc.) are only for illustrative purposes, and the actual implementation of the structure described in this article can be arranged in any direction or manner.

In recent years, Extended Reality (XR) has been widely studied and applied. XR integrates a virtual content and a real scene through the combination of a hardware device and a plurality of technical means to provide a user with a unique sensory experience. For example, the XR includes Virtual Reality VR, Augmented Reality AR, Mixed Reality MR, and so on. The VR uses a computer to simulate a virtual world of a three-dimensional space, providing the user with immersive experiences in visual, auditory, tactile, and other aspects. The AR enables real-time overlay of a real environment and a virtual object into the same space and coexist. The MR is a new visualization environment that integrates the real world and virtual world, where an object in a physical real-world scene coexists in real-time with an object in the virtual world.

In some scenarios, an electronic device can be implemented in a display device such as AR, VR, or MR, for example AR, VR, or MR glasses, etc. When a user wears a display device with the electronic device, the electronic device can be used for imaging display, interactive control, target recognition, identity verification, health monitoring, social interaction, and multi-person collaboration in various aspects. By using the electronic device, an imaging system can present the user with a clearer and smoother image.

Currently, a folding optical path lens, also known as a pancake lens, is started to be used in the display device described above. This type of lens usually refers to a small and lightweight thin lens or lens group, which mainly utilizes the principle of polarized light and adopts a folding optical path design. When an image source enters a semi-reflective and semi-transparent beam splitter, the light folds back a plurality of times between the lens, a phase delay film, and a reflective polarizing film, and finally exits from the reflective polarizing film and enters a human eye.

Compared to a traditional Fresnel lens, the folding optical path lenses can improve edge imaging distortion, enhance imaging contrast, clarity, and delicacy. In addition, the folding optical lenses can achieve adjustment of the diopter, allowing a myopic user to view the image clearly without wearing glasses.

Due to the lightweight nature of the folding optical path lens, it is difficult to arrange a camera of the electronic device between the lens and the display screen. Therefore, the embodiments of the present disclosure provide an electronic device to solve, or at least partially solve, an optical device arrangement problem and/or other potential problems caused by the use of the folding optical path lens.

The following provides a detailed explanation of a principle of the present disclosure, in conjunction with FIGS. 1 to 5.

As shown in FIG. 1, the electronic device 100 that can implement an eye tracking function according to the embodiments of the present disclosure may include a lens 110. The electronic device 100 may be, for example, a helmet, glasses, or other suitable wearable or portable devices for VR, AR, XR. In some scenarios, for example in a case that the electronic device 100 is applied to a wearable display device, the electronic device 100 may include a pair of lenses 110. It should be understood that in some other scenarios, for example analyzing a user behavior based on the eye tracking, the lens 110 can also be set in a single piece form.

In the embodiments of the present disclosure, the lens 110 can be implemented as the folding optical path lens or lens group, which can also be referred to as a pancake lens in the context of the present disclosure. It should be understood that any element with the same or similar structure and optical properties that can refract an optical path can also be used in the electronic device 100 of the present disclosure.

Figures 2, 3:
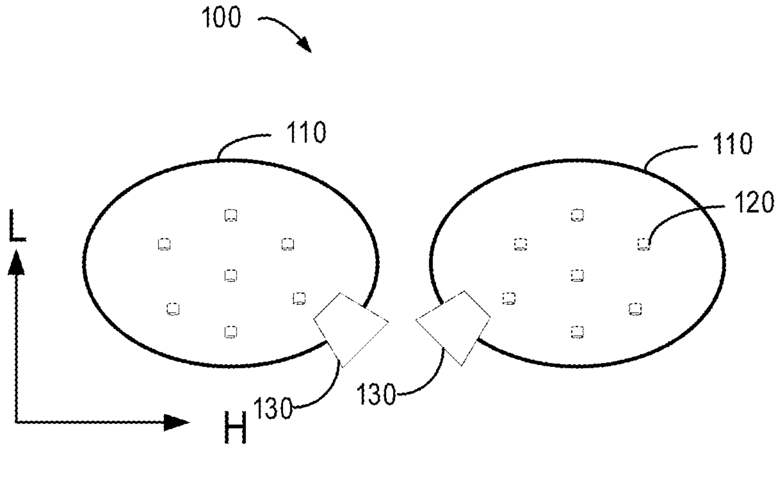
FIG. 2 shows a schematic diagram of another embodiment of an electronic device according to the embodiments of the present disclosure.
FIG. 3 shows a schematic diagram of another embodiment of an electronic device according to the embodiments of the present disclosure.

A plurality of light sources 120 are arranged at the lens 110. In some embodiments, as shown in FIG. 1, the plurality of light sources 120 are arranged around an edge of the lens 110. In some other embodiments, as shown in FIG. 2, the plurality of light sources 120 are arranged at a middle part of the lens 110. Alternatively or additionally, the plurality of light sources 120 shown in FIG. 2 can be embedded in the lens 110.

In the embodiments of the present disclosure, the plurality of light sources 120 can be realized as light emitting diodes (LED). Alternatively or additionally, the plurality of light sources 120 can also be realized as vertical-cavity surface-emitting lasers (VCSEL). It should be understood that the scope of the present disclosure is not limited to this. Other light-emitting elements with appropriate dimensions, structures, and features can be constructed as the plurality of light sources in the electronic device.

Figure 4:
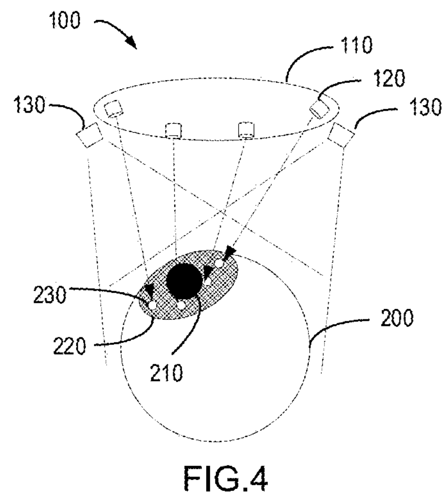
FIG. 4 shows a schematic diagram of an embodiment of a relative position between the electronic device and an eye according to the embodiments of the present disclosure.

In a case that the lens 110 of the electronic device 100 is placed in front of an eye of the user, the plurality of light sources in the electronic device 100 can be used to illuminate the eye of the user. As shown in FIG. 4, the electronic device 100 includes a lens 110 and the plurality of light sources 120 arranged at the edge of the lens 110. A light emitted by the light source 120 illuminates the eye 200, especially at an area adjacent to a pupil 210 and/or an iris 220 to produce a flicker 230.

The electronic device 100 may also include a camera 130. The camera 130 is used to capture an image of the eyes of the user. In some embodiments, the camera 130 may be disposed adjacent to an end of the lens 110 along a horizontal axis H of the lens 110. In a case that the user wears the electronic device 100, a direction of the horizontal axis H is essentially consistent with a direction of a connecting line between two eyes of the user. In a case that the lens 110 is a common elliptical shape, the horizontal axis H can usually be the major axis of an ellipse.

The examples shown in FIGS. 1 to 3 all follow this configuration. In the examples shown in FIG. 1 and FIG. 2, the camera 130 is arranged at a distal end of the lens 110 along the horizontal axis H of the lens 110. At this point, in a case that the user is wearing the electronic device 100, the camera 130 will be positioned adjacent to a bridge of a nose of the user. In the example shown in FIG. 3, the camera 130 is arranged at both a proximal end and the distal end of each lens 110 along the horizontal axis H of the lens 110. At this point, in a case that the user is wearing the electronic device 100, the camera 130 at the proximal end will be positioned adjacent to the bridge of the nose of the user, while the camera at the distal end will be positioned adjacent to a tempus (i.e. temple) of the user.

Figure 5:
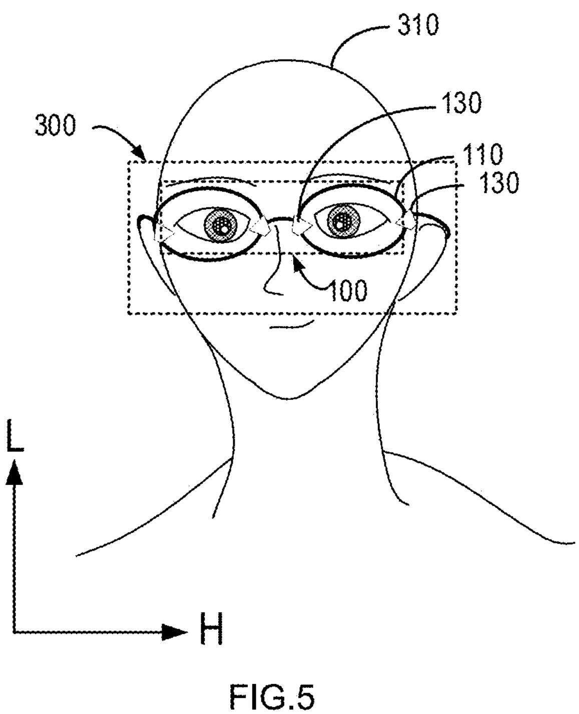
FIG. 5 shows a schematic diagram of an embodiment in which a user wears the electronic device according to the embodiments of the present disclosure.

In a case that the camera 130 is arranged at the distal end of the lens 110 along the horizontal axis H of the lens 110, as shown in FIG. 5, in a case that the user 310 wears the wearable display device 300, in some embodiments, the camera 130 can be located at the nose of the user 300, for example, at a position between the bridge of the nose and an inner eye corner of the user.

Since an acquisition angle for an eye image at the nose and the tempus is relatively wide, in such embodiments, by arranging the camera at such a position, it is possible to better capture a high-quality eye image, thus improving an accuracy of an eye position determination and the eye tracking.

It should be understood that the camera 130 of the electronic device 100 of the present disclosure is not limited to the arrangements shown in the embodiments in FIGS. 1 to 3. Without prejudice to a principle of the present disclosure, the position and/or number of the cameras 130 may be arbitrarily modified or adjusted.

Through the embodiments described above in combination with the accompanying drawings, the arrangement of the camera 130 and the light source 120 of the electronic device 100 is realized in the scene where a specific lens is used. Therefore, on the one hand, it ensures that a structure of the electronic device 100 does not affect the characteristics of the lens, and on the other hand, it also ensures a feasibility of capturing the eye image and quality of the image.

In the embodiments of the present disclosure, the electronic device 100 may also include a controller 140. The controller 140 may be integrated in the camera 130 or at least coupled with the camera 130 to obtain the eye image captured by the camera 130. Based on the image captured by the camera 130, The controller 140 can perform the eye tracking for the user. For example, the controller 140 can be implemented as a customized processing chip integrated with a camera sensor. In this way, it is possible to save data transmission delay from the camera 130 to the controller 140. Alternatively, the controller 140 can be implemented as a separate computing unit or on a same computing unit as an eye tracking algorithm.

The Eye tracking can, for example, involve tracking a center position of the pupil, a gaze angle and/or an eyeball movement trajectory of the user. For example, by determining a position and/or size of a predetermined reference portion of the eye of the user (such as the pupil) in the image, the controller 140 can determine the center position of the pupil and capture a current gaze direction of the user. Alternatively or additionally, by determining the position and/or size of the predetermined reference portion of the eye of the user in the image, the controller 140 can control a working mode of the camera 130. The working mode may be, for example, related to power consumption of the camera 130.

For example, the working mode of the camera 130 may include an image output mode of the camera. For example, if a pixel and/or resolution of the image output by camera 130 are higher, a power consumed by the camera 130 is greater. Once the predetermined reference portion of the eye of the user, such as the pupil, in the image captured by the camera 130 does not meet a predetermined condition in terms of the position and/or size, for example not capturing the pupil or only capturing a portion of image of the pupil, it may not have much reference value for a result of the eye tracking. In this case, it is expected to reduce a power consumption of the camera.

Therefore, in some embodiments, the controller 140 can determine the eye position through the image captured by the camera 130. If the controller 140 determines that the position and/or size of the predetermined reference portion of the eye of the user in the image meets the predetermined condition, the controller 140 causes the camera 130 to output the image by changing a size of the image, for example by scaling or cropping, etc. This mode of outputting image can, for example, involve a cropping mode. In this mode, the camera 130 can output a cropped images based on a region of interest.

In other embodiments, if the controller 140 determines that the position and/or size of the predetermined reference portion of the eye of the user in the image meets the predetermined condition, the controller 140 causes the camera 130 to output the image in a way that reduces the pixel and/or resolution. This mode of outputting image can, for example, merge a binning mode.

Therefore, the controller 140 can adjust the working mode of the camera according to the obtained image, thereby saving power consumption during a process of using the electronic device. Reducing power consumption is very beneficial in an application scenario of placing the electronic device on a wearable device. Because the wearable device often uses a charging power source, it is expected to reduce charging frequency of the power source and extend a continuous use time of the user.

It should be understood that although the electronic device according to the embodiments of the present disclosure is described in connection with FIGS. 1 to 5, the structure of the electronic device can be modified in any suitable way, for example by adding, removing, or replacing components, without prejudice to the principle of the present disclosure. It should be understood that at least a portion of the lens, camera, light source, and controller of the electronic device described in FIGS. 1 to 5 can be integrated and arranged.

In addition, the embodiments of the present disclosure also provide the wearable display device, which can include the electronic device described above. As shown in FIG. 5, the wearable display device 300 may include the electronic device 100. The wearable display device 300 may be the AR, VR, or MR display device mentioned above, including but not limited to a head mounted display, smart glasses, a user behavior analysis device, etc.

All embodiments of the present disclosure have been described above. The above description is exemplary, not exhaustive, and is not limited to the disclosed embodiments. Without deviating from the scope and spirit of the described embodiments, many modifications and changes are obvious to ordinary technicians in the field. The choice of terms used herein is intended to best explain the principle, practical application or technical improvement in the market of each embodiments, or to enable other ordinary technicians in the field to understand each embodiments disclosed herein.

What is claimed is:

1. An electronic device comprising:

a lens comprising a folding optical path lens;

a plurality of light sources disposed on or adjacent to an edge of the lens, and configured to illuminate an eye of a user;

at least one camera disposed adjacent to the edge of the lens, and configured to capture an image of the eye, wherein the at least one camera comprises a first camera disposed adjacent to an end of the lens along a horizontal axis of the lens and a second camera disposed adjacent to an end of the lens along a longitudinal axis of the lens; and a controller configured to perform eye tracking for the user based on the image captured by the at least one camera, and based on a position or a size of a predetermined reference portion of the eye of the user in the image, control a working mode of the at least one camera, the working mode being at least associated with a power consumption of the at least one camera, wherein the controller causes the camera to output the image by changing a size of the image in response to the position and/or the size satisfying a predetermined condition.

2. The electronic device of claim 1, wherein at least a portion of the plurality of light sources are embedded in the lens.

3. The electronic device of claim 1, wherein at least a portion of the lens, the plurality of light sources, the at least one camera, and the controller are integrated with each other.

4. The electronic device of claim 1, wherein the plurality of light sources comprise light emitting diodes and/or vertical-cavity surface-emitting lasers.

5. A wearable display device comprising an electronic device comprising:

a lens comprising a folding optical path lens;

a plurality of light sources disposed on or adjacent to an edge of the lens, and configured to illuminate an eye of a user;

at least one camera disposed adjacent to the edge of the lens, and configured to capture an image of the eye, wherein the at least one camera comprises a first camera disposed adjacent to an end of the lens along a horizontal axis of the lens and a second camera disposed adjacent to an end of the lens along a longitudinal axis of the lens; and a controller configured to perform eye tracking for the user based on the image captured by the at least one camera, and based on a position or a size of a predetermined reference portion of the eye of the user in the image, control a working mode of the at least one camera, the working mode being at least associated with a power consumption of the at least one camera, wherein the controller causes the camera to output the image by changing a size of the image in response to the position and/or the size satisfying a predetermined condition.

6. The wearable display device of claim 5, wherein at least a portion of the plurality of light sources are embedded in the lens.

7. The wearable display device of claim 5, wherein at least a portion of the lens, the plurality of light sources, the at least one camera, and the controller are integrated with each other.

8. The wearable display device of claim 5, wherein the plurality of light sources comprise light emitting diodes and/or vertical-cavity surface-emitting lasers.

* * * * *